United States Patent
Rabbani et al.

(10) Patent No.: US 11,093,462 B1
(45) Date of Patent: Aug. 17, 2021

(54) METHOD AND SYSTEM FOR IDENTIFYING ACCOUNT DUPLICATION IN DATA MANAGEMENT SYSTEMS

(71) Applicant: Intuit Inc., Mountain View, CA (US)

(72) Inventors: Tarek Rabbani, Mountain View, CA (US); Kishore Nene, San Jose, CA (US); Siddhartha Misra, San Jose, CA (US); Don Emmanuel Bernal, San Carlos, CA (US)

(73) Assignee: Intuit Inc., Mountain View, CA (US)

( * ) Notice: Subject to any disclaimer, the term of this patent is extended or adjusted under 35 U.S.C. 154(b) by 441 days.

(21) Appl. No.: 16/116,558

(22) Filed: Aug. 29, 2018

(51) Int. Cl.
| | |
|---|---|
| *G06F 16/30* | (2019.01) |
| *G06F 16/215* | (2019.01) |
| *G06K 9/62* | (2006.01) |
| *H04L 29/08* | (2006.01) |
| *G06F 16/22* | (2019.01) |
| *G06F 16/901* | (2019.01) |
| *G06Q 40/02* | (2012.01) |

(52) U.S. Cl.
CPC ........ *G06F 16/215* (2019.01); *G06F 16/2282* (2019.01); *G06F 16/9024* (2019.01); *G06K 9/6201* (2013.01); *G06K 9/6224* (2013.01); *G06Q 40/02* (2013.01); *H04L 67/306* (2013.01)

(58) Field of Classification Search
CPC ... G06Q 40/02; G06F 16/215; G06F 16/2282; G06F 16/9024; G06K 9/6201; G06K 9/6224; H04L 67/306
See application file for complete search history.

(56) References Cited

U.S. PATENT DOCUMENTS

| | | | |
|---|---|---|---|
| 4,989,141 | A | 1/1991 | Lyons et al. |
| 5,680,305 | A | 10/1997 | Apgar, IV |
| 5,842,185 | A | 11/1998 | Chancey et al. |
| 5,873,251 | A | 2/1999 | Iino |
| 5,956,691 | A | 9/1999 | Powers |
| 6,021,415 | A | 2/2000 | Cannon et al. |
| 6,032,134 | A | 2/2000 | Weissman |
| 6,073,108 | A | 6/2000 | Peterson |
| 6,128,602 | A | 10/2000 | Northington et al. |
| 6,430,539 | B1 | 8/2002 | Lazarus et al. |

(Continued)

OTHER PUBLICATIONS

Horesh et al., "Method and System for Detecting Unlisted Accounts in an Account Aggregating System," U.S. Appl. No. 15/905,634, filed Feb. 26, 2018.

(Continued)

*Primary Examiner* — Mahesh H Dwivedi
(74) *Attorney, Agent, or Firm* — Paradice and Li LLP

(57) ABSTRACT

A method and system of identifying account duplication in data management systems utilizes a dual-phase approach, consisting of a projection phase and a clustering phase. In the projection phase, user account and transaction data is obtained and grouped into transactions entities. These transactions entities are then processed to create transactions entity projections. In the clustering phase, the transactions entity projections are grouped and aggregated according to specified parameters, which results in the generation of transactions graphs. The data from the transactions graphs is processed and analyzed to generate reliable indicators representing the presence or absence of account duplication in a data management system.

36 Claims, 8 Drawing Sheets

(56) References Cited

U.S. PATENT DOCUMENTS

| | | |
|---|---|---|
| 6,542,896 B1 | 4/2003 | Gruenwald |
| 6,792,422 B1 | 9/2004 | Stride et al. |
| 7,321,869 B1 | 1/2008 | Phibbs, Jr. |
| 7,801,987 B2 | 9/2010 | Grell et al. |
| 7,912,842 B1 | 3/2011 | Bayliss |
| 8,175,908 B1 | 5/2012 | Anderson |
| 8,177,121 B2 | 5/2012 | Zimmerman et al. |
| 8,243,074 B1 | 8/2012 | Kilat et al. |
| 8,250,008 B1 | 8/2012 | Cao et al. |
| 8,346,661 B2 | 1/2013 | Allison et al. |
| 8,554,592 B1 | 10/2013 | Merz |
| 8,612,262 B1 | 12/2013 | Condon et al. |
| 8,732,055 B1 | 5/2014 | Dinamani et al. |
| 8,818,888 B1 | 8/2014 | Kapczynski et al. |
| 9,286,332 B1 | 3/2016 | Roumeliotis et al. |
| 9,449,056 B1 | 9/2016 | Deng et al. |
| 9,691,058 B2 | 6/2017 | Epler et al. |
| 10,579,682 B1 * | 3/2020 | Cowan .................. G06N 20/00 |
| 2002/0073114 A1 | 6/2002 | Nicastro et al. |
| 2002/0169658 A1 | 11/2002 | Adler |
| 2002/0173986 A1 | 11/2002 | Lehew et al. |
| 2002/0184043 A1 | 12/2002 | Lavorgna et al. |
| 2002/0198775 A1 | 12/2002 | Ryan |
| 2003/0065677 A1 | 4/2003 | Culp et al. |
| 2003/0167253 A1 | 9/2003 | Meinig |
| 2003/0195780 A1 | 10/2003 | Arora et al. |
| 2004/0015381 A1 | 1/2004 | Johnson et al. |
| 2004/0093281 A1 | 5/2004 | Silverstein et al. |
| 2004/0122905 A1 | 6/2004 | Smith et al. |
| 2004/0138932 A1 | 7/2004 | Johnson et al. |
| 2004/0138934 A1 | 7/2004 | Johnson et al. |
| 2004/0138935 A1 | 7/2004 | Johnson et al. |
| 2004/0138936 A1 | 7/2004 | Johnson et al. |
| 2004/0236734 A1 | 11/2004 | Yip et al. |
| 2004/0243489 A1 | 12/2004 | Mitchell et al. |
| 2005/0013428 A1 | 1/2005 | Walters, Jr. |
| 2005/0131815 A1 | 6/2005 | Fung et al. |
| 2005/0154617 A1 | 7/2005 | Ruggieri et al. |
| 2005/0154769 A1 | 7/2005 | Eckart et al. |
| 2005/0240881 A1 | 10/2005 | Rush et al. |
| 2005/0252963 A1 | 11/2005 | Adams et al. |
| 2005/0257209 A1 | 11/2005 | Adams et al. |
| 2005/0289024 A1 | 12/2005 | Hahn-Carlson et al. |
| 2006/0004746 A1 | 1/2006 | Angus et al. |
| 2006/0123461 A1 | 6/2006 | Lunt et al. |
| 2006/0178961 A1 | 8/2006 | Stanley et al. |
| 2006/0293945 A1 | 12/2006 | Feraud et al. |
| 2007/0022025 A1 | 1/2007 | Litman et al. |
| 2007/0055597 A1 | 3/2007 | Patel et al. |
| 2007/0061187 A1 | 3/2007 | Laskowski-Bender |
| 2007/0150139 A1 | 6/2007 | Hardy |
| 2007/0162445 A1 | 7/2007 | Scriffignano et al. |
| 2007/0208503 A1 | 9/2007 | Harnsberger |
| 2007/0233565 A1 | 10/2007 | Herzog et al. |
| 2007/0239799 A1 | 10/2007 | Modi |
| 2007/0250258 A1 | 10/2007 | Hager |
| 2007/0265995 A1 | 11/2007 | Remington et al. |
| 2008/0004924 A1 | 1/2008 | Cao et al. |
| 2008/0065491 A1 | 3/2008 | Bakman |
| 2008/0147425 A1 | 6/2008 | Durvasula et al. |
| 2008/0208638 A1 | 8/2008 | Davidson et al. |
| 2008/0301162 A1 | 12/2008 | Wall et al. |
| 2009/0043637 A1 | 2/2009 | Eder |
| 2009/0048884 A1 | 2/2009 | Olives et al. |
| 2009/0119190 A1 * | 5/2009 | Realini .................. G06Q 20/04 705/30 |
| 2009/0144201 A1 | 6/2009 | Gierkink et al. |
| 2009/0193046 A1 | 7/2009 | Desai et al. |
| 2009/0234826 A1 | 9/2009 | Bidlack |
| 2009/0240737 A1 | 9/2009 | Hardisty et al. |
| 2009/0282010 A1 | 11/2009 | Vasudevan et al. |
| 2009/0283591 A1 | 11/2009 | Silbernagl |
| 2010/0005048 A1 | 1/2010 | Bodapati et al. |
| 2010/0057742 A1 | 3/2010 | Hardy-McGee |
| 2010/0076812 A1 | 3/2010 | Ghosh et al. |
| 2010/0205076 A1 * | 8/2010 | Parson .................. G06Q 40/12 705/30 |
| 2010/0257006 A1 * | 10/2010 | Quadracci .............. G06Q 30/02 705/7.33 |
| 2011/0087575 A1 | 4/2011 | DeBie et al. |
| 2011/0191191 A1 | 8/2011 | Bax et al. |
| 2011/0231246 A1 | 9/2011 | Bhatia et al. |
| 2011/0289109 A1 | 11/2011 | Kaoru |
| 2012/0016738 A1 | 1/2012 | Ouimet |
| 2012/0102036 A1 | 4/2012 | Parker et al. |
| 2012/0109734 A1 | 5/2012 | Fordyce et al. |
| 2012/0173250 A1 | 7/2012 | Jeffrey et al. |
| 2012/0173397 A1 | 7/2012 | Elwell et al. |
| 2012/0189186 A1 | 7/2012 | Csulits et al. |
| 2012/0226583 A1 | 9/2012 | Uehara et al. |
| 2012/0226670 A1 * | 9/2012 | Arcushin ............... G06Q 30/06 707/692 |
| 2012/0284105 A1 | 11/2012 | Li |
| 2012/0330971 A1 | 12/2012 | Thomas et al. |
| 2013/0013491 A1 * | 1/2013 | Selway ................ G06Q 20/042 705/39 |
| 2013/0085910 A1 | 4/2013 | Chew |
| 2013/0132410 A1 | 5/2013 | Rineer |
| 2013/0291060 A1 | 10/2013 | Moore |
| 2013/0297381 A1 | 11/2013 | Akkihal et al. |
| 2013/0339311 A1 | 12/2013 | Ferrari et al. |
| 2014/0101004 A1 | 4/2014 | Marseille et al. |
| 2015/0052035 A1 | 2/2015 | Calman et al. |
| 2016/0078559 A1 | 3/2016 | Ventura |
| 2017/0228614 A1 | 8/2017 | Gandhi et al. |
| 2019/0155894 A1 | 5/2019 | Gandhi et al. |
| 2019/0391983 A1 | 12/2019 | Jiang et al. |
| 2020/0242699 A1 * | 7/2020 | Mozeika ............... G06F 3/0481 |

OTHER PUBLICATIONS

Horesh et al., "Method and System for Detecting Unlisted Accounts and the Identity of the Account Providers Associated With Unlisted Accounts in an Account Aggregating System," U.S. Appl. No. 16/053,339, filed Aug. 2, 2018.

Luxurious Credit, "How to Update/Change Categories in your Mint.com Transactions," YouTube, Sep. 28, 2016 (Year: 2016).

Wells, Fargo & Co's Express 1898 Wire Transfer Receipt (Year: 1898).

Bose, Ranjit, "Knowledge management-enabled health care management systems: capabilities, infrastructure, and decision-support," Expert Systems with Applications 24 (2003) 59-71, 2002, Elsevier Science Ltd.

* cited by examiner

Projection Phase 203

Projections 401 entity projection parameters 403

431:
| num_transactions | abs_mean | abs_stdv |
|---|---|---|
| 2 | 31.57 | 28.425 |

433:
| num_transactions | abs_mean | abs_stdv |
|---|---|---|
| 1 | 42.70 | 0 |

435:
| num_transactions | abs_mean | abs_stdv |
|---|---|---|
| 1 | 6.00 | 0 |

437:
| num_transactions | abs_mean | abs_stdv |
|---|---|---|
| 1 | 40.00 | 0 |

439:
| num_transactions | abs_mean | abs_stdv |
|---|---|---|
| 2 | 31.57 | 28.425 |

441:
| num_transactions | abs_mean | abs_stdv |
|---|---|---|
| 1 | 42.70 | 0 |

Transactions Entities 343 transaction grouping parameters 323

331:
| credset_id 301 | account_id 305 | posted_date 311 |
|---|---|---|
| 132f-w23f-2sdh-23 | account_123 | 12/1/17 |

333:
| credset_id 301 | account_id 305 | posted_date 313 |
|---|---|---|
| 132f-w23f-2sdh-23 | account_123 | 12/4/17 |

335:
| credset_id 301 | account_id 307 | posted_date 315 |
|---|---|---|
| 132f-w23f-2sdh-23 | account_235 | 12/2/17 |

337:
| credset_id 301 | account_id 307 | posted_date 317 |
|---|---|---|
| 132f-w23f-2sdh-23 | account_235 | 12/3/17 |

339:
| credset_id 301 | account_id 309 | posted_date 319 |
|---|---|---|
| 132f-w23f-2sdh-23 | account_568 | 12/1/17 |

341:
| credset_id 301 | account_id 309 | posted_date 321 |
|---|---|---|
| 132f-w23f-2sdh-23 | account_568 | 12/4/17 |

FIG. 4

Transactions Entity Projection Table 501

Transactions Entity Projections 503 transaction grouping parameters 323: credset_id 505, account_id 507, posted_date 509 entity projection parameters 403: num_transactions 511, abs_mean 513, abs_stdv 515

| credset_id 505 | account_id 507 | posted_date 509 | num_transactions 511 | abs_mean 513 | abs_stdv 515 |
|---|---|---|---|---|---|
| 132f-w23f-2sdh-23 | account_123 | 12/1/17 | 2 | 31.57 | 28.425 | ← 531
| 132f-w23f-2sdh-23 | account_123 | 12/4/17 | 1 | 42.70 | 0 | ← 533
| 132f-w23f-2sdh-23 | account_235 | 12/2/17 | 1 | 6.00 | 0 | ← 535
| 132f-w23f-2sdh-23 | account_235 | 12/3/17 | 1 | 40.00 | 0 | ← 537
| 132f-w23f-2sdh-23 | account_568 | 12/1/17 | 2 | 31.57 | 28.425 | ← 539
| 132f-w23f-2sdh-23 | account_568 | 12/4/17 | 1 | 42.70 | 0 | ← 541

Clustering Phase 211

FIG. 5

Transactions Entity Projection Table 601

Transactions Entity Projections 503 | Clustering parameters 603

| credset_id 505 | account_id 507 | posted_date 509 | num_transactions 511 | abs_mean 513 | abs_stdv 515 |
|---|---|---|---|---|---|
| 132f-w23f-2sdh-23 | account_123 | 12/1/17 | 2 | 31.57 | 28.425 |
| 132f-w23f-2sdh-23 | account_568 | 12/1/17 | 2 | 31.57 | 28.425 |
| 132f-w23f-2sdh-23 | account_235 | 12/2/17 | 1 | 6.00 | 0 |
| 132f-w23f-2sdh-23 | account_235 | 12/3/17 | 1 | 40.00 | 0 |
| 132f-w23f-2sdh-23 | account_123 | 12/4/17 | 1 | 42.70 | 0 |
| 132f-w23f-2sdh-23 | account_568 | 12/4/17 | 1 | 42.70 | 0 |

Clustering Phase 211

FIG. 6

Matched Accounts Table 701

| credset_id 505 | account_id_0 709 | account_id_1 711 | posted_date 509 | num_transactions 511 |
|---|---|---|---|---|
| 132f-w23f-2sdh-23 | account_123 | account_568 | 12/1/17 | 2 |
| 132f-w23f-2sdh-23 | account_123 | account_568 | 12/4/17 | 1 |

705 ⟵ (row 1)
707 ⟵ (row 2)

Clustering Phase
211

FIG. 7

METHOD AND SYSTEM FOR IDENTIFYING ACCOUNT DUPLICATION IN DATA MANAGEMENT SYSTEMS

BACKGROUND

Millions of people turn to electronic data management systems for assistance in managing various kinds of data. Electronic data management systems are typically software applications, which provide an efficient and convenient way for users of the data management system to manage many kinds of data. For example, data management systems are often used for assistance with tax return preparation, bookkeeping, accounting, and transaction monitoring.

One class of electronic data management systems are account aggregation data management systems. Typically, account aggregation data management systems request that users of the system provide their account credentials for one or more accounts provided by one or more user account providers, such as banks, credit card companies, and other institutions. This enables account aggregation data management systems to identify a user's accounts and obtain copies of the user's account and transaction data through a variety of methods, such as data scraping, downloading user account files, and/or through an API provided by the user account provider.

Once a user's account and transaction data is obtained from the one or more user account providers, the user account and transaction data must then be reconciled and merged with any account and transaction data already stored in the account aggregation data management system's internal database. Typically, the user account and transaction data is then processed and provided to the user in the form of various visualizations and reports, along with other features to assist the user in interpreting and managing their account and transaction data.

In order to provide the maximum benefit to a user of an account aggregation data management system, the user's account and transaction data is typically obtained from as many user account providers associated with the user as possible. An account aggregation data management system's ability to accurately identify, efficiently obtain, and effectively reconcile a user's account and transaction data from multiple sources is what allows the account aggregation data management system to provide the features that are of interest to the user. Consequently, ideally, user account and transaction data is obtained for all of a user's accounts across all account providers associated with a user.

However, identifying, obtaining, and reconciling a user's account and transaction data from multiple and potentially redundant sources can be challenging. This process is prone to errors, and can lead to several issues, some of which significantly impact the ability of an account aggregation data management system to provide accurate and useful information to a user. One such significant issue associated with reconciling account and transaction data from multiple sources is the problem of duplicate account listings.

Duplicate account listings arise for a variety of reasons, such as software bugs, scripting errors, and/or changes at account provider websites. As noted above, in some situations, user account providers offer several ways to obtain account and transaction data automatically, such as data scraping, downloading user account files, and/or through an API provided by the user account provider. Duplicate listings of accounts often arise when a switch is made from one method of obtaining account and transaction data to another. Further, when a user decides to rename one of their accounts, the account renaming commonly results in duplicate account listings.

For instance, a user may have two separate accounts with a given account provider, Bank X. A first account may be identified within the Bank X system as "Checking Account," and a second account may be identified within the Bank X system as "Credit Card Account." The account aggregation data management system may already contain the same two accounts for the same user, however the first account may be currently identified within the account aggregation data management system as, for example, "James Checking" instead of "Checking Account." Consequently, when the account aggregation data management system obtains and reconciles the user's account data, the account aggregation data management system would now include three account listings associated with this user, "Checking Account," "James Checking," and "Credit Card Account," when in fact only two accounts exist, "Checking Account" and "Credit Card Account."

Consequently, absent further analysis, the account aggregation data management system would treat "Checking Account" and "James Checking" as two distinct accounts. As a result, if the single actual checking account contained $10,000.00 in available funds, the user account data stored in the account aggregation data management system would incorrectly show $20,000.00 in available funds for the incorrectly identified "two" checking accounts, as opposed to the actual $10,000.00 amount in the single actual checking account. In addition, each transaction associated with the single checking account would potentially be counted twice, likely resulting in significant errors and misrepresentations of user data in the visualizations and reports provided to the user.

The duplicate account situation described above represents a long-standing technical problem, which is a serious issue for both the account aggregation data management system and the user of the account aggregation data management system. This is particularly true given that it has been shown that even one instance of providing incorrect data to a user results in a high likelihood of a user abandoning the account aggregation data management system entirely. Despite the serious nature of this long-standing technical problem, currently available methods for identifying duplicate accounts are extremely inefficient, labor and/or processor intensive, time consuming, and generally interfere with the effective implementation and operation of account aggregation data management systems.

What is needed is an effective and efficient technical solution for identifying account duplication in data management systems. Further, due to the massive quantity of account data being processed by account aggregation data management systems, as well as the need to provide a relatively seamless interface for the user, any technical solution for identifying account duplication must be performed on back-end systems with minimal latency and be largely invisible to the user. Additionally, ideally the technical solution should be easy to implement, and performed in a way that minimizes the use of processor cycles, processing power, and data transfer bandwidth.

SUMMARY

Embodiments of the present disclosure provide an effective and efficient technical solution for solving the technical problem of identifying account duplication in data management systems. The method and system for identifying account duplication discussed herein utilizes a dual-phase approach, which results in a reliable indication of the presence or absence of account duplication in a data management system, and is performed on a back-end system with minimal latency and minimal awareness by the user. Further, the method and system for identifying account duplication discussed herein is easy to implement, and is performed in a way that minimizes the use of processor cycles, processing power, and data transfer bandwidth.

As discussed in further detail below, in one embodiment, the disclosed dual-phase approach consists of a projection phase, and a clustering phase. In one embodiment, in the projection phase, user account and transaction data is obtained and grouped into one or more transactions entities. These transactions entities are then projected into n-dimensional space to generate transactions entity projections. In one embodiment, in the clustering phase, the transactions entity projections are then grouped according to specified parameters, and user accounts with matching parameters are aggregated into a list of matched accounts. The matched accounts are then grouped in pairs, and the number of transactions in each transactions entity projection is summed for each pair of matched accounts.

In one embodiment, a bi-directional transactions graph is then generated, where the nodes in the bi-directional transactions graph represent user accounts, and the weights of the edges between the nodes represent the number of transactions in common between any two accounts. In one embodiment, data representing the edge weights between the nodes in the bi-directional transactions graph have been determined by the inventors to be reliable indicators of the presence or absence of account duplication between any two accounts in a data management system.

According to various embodiments, the resulting indications of the presence or absence of account duplication are then utilized in one or more systems in several ways, including, but not limited to, identifying and correcting software bugs or scripting errors that resulted in the account duplication and/or assisting users with merging their duplicate account and transaction data.

Using the method and system for identifying account duplication in data management systems discussed herein, identification of duplicate accounts is accomplished without the need to compare every possible combination of account and transaction data between multiple accounts for millions of users, a method which would be unacceptable and simply not feasible for such large quantities of data, due to the significant processing power, memory, and bandwidth usage that would be required to accomplish this task.

Therefore, the method and system discussed herein provides a technical solution to a problem that was previously considered unworkable, by making it possible to efficiently process the account and transaction data of millions of users to identify duplicate accounts, while avoiding wasting time and resources applying more costly analysis.

Consequently, the method and system discussed herein provides a reliable technical solution for identifying duplicate accounts that is effective, efficient, easy to implement, is performed with minimal latency and minimal awareness by the user, and also significantly minimizes the use of processor cycles, processing power, memory, and bandwidth.

BRIEF DESCRIPTION OF THE DRAWINGS

FIG. 4 is an illustrative example of projections generated for transactions entities in accordance with one embodiment.

FIG. 5 is an illustrative example of a transactions entity projection table as generated in accordance with one embodiment.

FIG. 6 is an illustrative example of a transactions entity projection table as processed and grouped in accordance with one embodiment.

FIG. 7 is an illustrative example of a matched accounts table generated in accordance with one embodiment.

Figure 1:
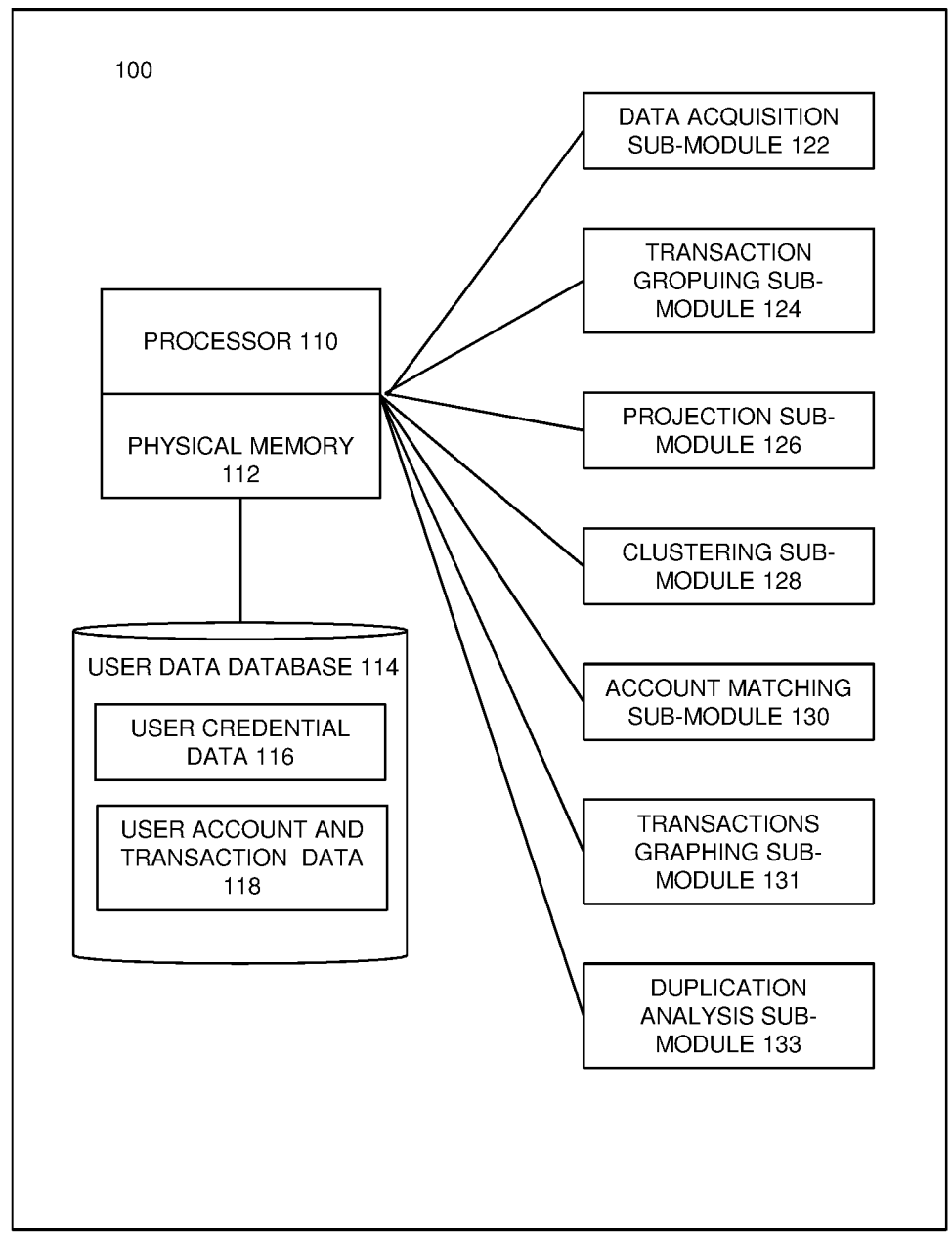
FIG. 1 is a block diagram of a system for identifying account duplication in data management systems, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

Term Definitions

Various embodiments of systems and methods described herein include one or more computers, which may be referred to herein as computing systems or processors. As used herein the term computer includes any programmable machine or machines capable of performing arithmetic and/or logical operations. In various embodiments, computers include one or more of processors, memories, data storage devices, and/or other known or novel components as discussed herein, and/or as known in the art at the time of filing, and/or as developed after the time of filing. In various embodiments, these components are connected physically or through network or wireless links. In various embodiments, computers include software which directs the operations of the aforementioned components.

Herein, computers may be referred to with terms that are commonly used by those of ordinary skill in the relevant arts, such as servers, PCs, mobile devices, routers, switches, data centers, distributed computers, and other terms. In various embodiments, computers facilitate communications between users and/or other computers, provide databases, perform analysis and/or transformation of data, and/or perform other functions. It will be understood by those of ordinary skill that those terms used herein are interchangeable, and any computer capable of performing the described functions may be used.

In various embodiments, computers may be linked to one another via a network or networks. In various embodiments, a network is any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). In various embodiments, connections between computers may use any protocols, including connection-oriented protocols such as TCP or connectionless protocols such as UDP. Any connection through which at least two computers may exchange data can be the basis of a network.

Herein, a "data management system" includes, but is not limited to, any system or application implemented on a computing system, accessed through one or more servers, accessed through a network, accessed through a cloud, and/or provided through any system or by any means, as discussed herein, and/or as known in the art at the time of filing, and/or as developed after the time of filing, that gathers data from one or more sources and/or has the capability to analyze and categorize at least part of the data.

As used herein, the term "account aggregation" includes the process of identifying accounts, and preferably all accounts of a given type or class, associated with a user and then providing access to the contents of the accounts.

As used herein, the term "account aggregation data management system" includes any data management system that relies on "account aggregation" to identify accounts, preferably all accounts, associated with a user of the account aggregation data management system and then accesses and processes the contents of the accounts to provide various reports, advice, snapshots, and other features.

Herein, a "financial management system" can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data. As used herein, the term "financial management system" includes, but is not limited to the following: computing system implemented, and/or online, and/or web-based, personal and/or business financial management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the terms "user account provider" and "account provider" can be used interchangeably and include, but are not limited to, any entity that provides user accounts, such as but not limited to, financial accounts, through which a user or other party can conduct transactions, including, but not limited to, financial transactions.

As used herein, the term "user credential set ID" includes, but is not limited to, a set of user credential data, such as, but not limited to, the name of a user account provider, a user name and/or user email address, a password, passcode, or passphrase, answers to security questions, identification numbers, birth dates, or other types of verification credentials associated with a user and a user account provider.

As used herein, the term "transaction grouping parameters" includes parameters that define the user account and transaction data, such as, but not limited to, a user credential set ID, a user account name, account number, or account ID, and/or a posted transaction date, which are used to group transactions into transactions entities, according to one embodiment.

As used herein, the term "transactions entity" includes, but is not limited to, a collection of transactional data, such as transaction amounts and payee data, as grouped according to common transaction grouping parameters, such as, but not limited to, a user credential set ID, a user account name, account number, or account ID, and/or a posted transaction date.

As used herein, the term "transactions entity projection" includes, but is not limited to, a combination of data from the defined transactions entities, and projection data that is generated by projecting a defined transactions entity into n-dimensional space based upon entity projection parameters chosen to represent the transactions entity.

As used herein, the term "entity projection parameters" includes, but is not limited to, parameters such as the number of transactions in a transactions entity, the mean of the transaction amounts in a transactions entity, and the standard deviation of the transaction amounts in a transactions entity, which are used to generate a transactions entity projection, in accordance with one embodiment.

As used herein, the term "clustering parameters" includes, but is not limited to, parameters that define the data in the transactions entity projections. In the embodiments discussed herein, the clustering parameters are used in the clustering phase while processing the data in the transactions entity projection table and the matched accounts table. Examples of clustering parameters include, but are not limited to, a user credential set ID, a posted date of a transactions entity, the number of transactions in a transactions entity, the mean of the transaction amounts in a transactions entity, and the standard deviation of the transaction amounts in a transactions entity.

As used herein, the term "bi-directional transactions graph" includes, but is not limited to, a bi-directional graph, which may be presented in tabular, graphical, and/or pictorial form, and is used herein to represent potential relationships between user accounts and user transaction data.

As used herein, the term "account duplication indicator" includes, but is not limited to, a numerical value and/or a string of text that is generated as a result of the operation of the system and method for identifying account duplication disclosed herein, and which indicates the likelihood of account duplication between any two user accounts, in accordance with one embodiment.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Using the disclosed embodiments, a method and system for identifying account duplication in data management systems is provided. The disclosed embodiments provide a technical solution to the long standing technical problem of identifying account duplication in data management systems through a dual-phase approach which leads to the efficient and reliable detection of the presence or absence of account duplication in data management systems.

As discussed in further detail below, in one embodiment, the dual-phase approach consists of a projection phase, and a clustering phase. In one embodiment, in the projection phase, user account and transaction data is obtained and grouped into a number of transactions entities. These transactions entities are then projected into n-dimensional space to generate transactions entity projections. In one embodiment, in the clustering phase, the transactions entity projections are then grouped according to specified clustering parameters, and user accounts with matching clustering parameters are aggregated into a list of matched accounts. The matched accounts are then grouped in pairs, and the number of transactions in each transactions entity projection is summed across one or more posted transaction dates for each pair of matched accounts. A bi-directional transactions graph is then generated, where the nodes in the bi-directional transactions graph represent user accounts, and the weights of the edges between the nodes represent the number of transactions in common between any two user accounts. In one embodiment, data representing the edge weights between the nodes in the bi-directional transactions graph are used as account duplication indicators, which indicate the presence or absence of account duplication between any two accounts in a data management system.

In one embodiment, the account duplication indicator, as generated by the technical solution disclosed herein, represents the likelihood of account duplication system-wide across one or more user account provider systems. In one embodiment, once the presence of account duplication is detected across the systems of one or more user account providers, the account duplication indicator is used to locate potential technical errors in the software and/or scripts used by the account aggregation data management system to obtain user account and transaction data from the one or more user account providers. Thus, the technical solution disclosed herein cannot be implemented solely by mental steps or pen and paper, is not an abstract idea, and is, in fact, directed to providing technical solutions to relatively new technical problems associated with account duplication in account aggregation data management systems.

In another embodiment, the account duplication indicator, as generated by the technical solution disclosed herein, represents the likelihood of account duplication across the accounts of one or more individual users. In one embodiment, once account duplication is detected across the accounts for one or more individual users, the one or more individual users are provided with information pertaining to the potential account duplication, and are then given a chance to provide confirmation of account duplication. In one embodiment, once a user provides confirmation of account duplication, the account aggregation data management system proceeds to merge the user account data from duplicate account listings, thereby eliminating duplicate account listings. Thus, the technical solution disclosed herein cannot be implemented solely by mental steps or pen and paper, is not an abstract idea, and is, in fact, directed to providing technical solutions to relatively new technical problems associated with account duplication in account aggregation data management systems.

Additionally, the disclosed method and system for identifying account duplication in data management systems identifies account duplication in account aggregation data management systems through a specific process comprising the projection and clustering of user account and transaction data, and does not encompass, embody, or preclude other forms of innovation in the area of account duplication detection. Further, the disclosed embodiments of systems and methods for identifying account duplication in an account aggregation data management system are not abstract ideas for at least several reasons.

First, effectively and efficiently identifying duplicate accounts in an account aggregation data management system is not an abstract idea because it is not merely an idea of itself. For example, the process cannot be performed mentally or using pen and paper, as it is not possible for the human mind to identify, process, and analyze all possible combinations of user account and transaction data from millions of users of a data management system, even with pen and paper to assist the human mind and even with unlimited time.

Second, effectively and efficiently identifying duplicate accounts in an account aggregation data management system is not a fundamental economic practice (e.g., is not merely creating a contractual relationship, hedging, mitigating a settlement risk, etc.).

Third, effectively and efficiently identifying duplicate accounts in an account aggregation data management system is not a method of organizing human activity (e.g., managing a game of bingo). Rather, in one embodiment, effectively and efficiently identifying duplicate accounts in an account aggregation data management system provides a tool that significantly improves the field of data management by reducing the number of duplicate user account listings in data management systems and thereby increasing the accuracy of the recommendations, reports, and data analysis provided to users of an account aggregation data management system.

Fourth, although mathematics may be used, the disclosed and claimed systems and methods are not an abstract idea because the disclosed systems and methods are not simply a mathematical relationship/formula.

In addition, using the disclosed embodiments, an account aggregation data management system is provided that is more likely to correctly identify all the user account and transaction data needed to provide a user with accurate and current reports, advice, data analysis, and snapshots based on more reliable data sets. This fact increases loyalty to the account aggregation data management system and results in repeat customers, efficient data and transaction management services, and reduced abandonment of use of the account aggregation data management system.

In addition, effectively and efficiently identifying duplicate accounts in an account aggregation data management system results in less processing resources being consumed, less memory utilization, and less data transfer bandwidth being used. Therefore, hardware systems utilizing the disclosed embodiments operate more efficiently and are transformed into more accurate and effective systems by implementing the disclosed embodiments. Consequently, the disclosed embodiments allow both human and non-human resources to be utilized more efficiently.

Referring now to the figures, FIG. 1 is a block diagram of an account duplication identification module 100 in accordance with one embodiment. In one embodiment, account duplication identification module 100 includes processor 110 which, along with physical memory 112, coordinates the operation and interaction of data acquisition sub-module 122, transaction grouping sub-module 124, projection sub-module 126, clustering sub-module 128, account matching sub-module 130, transactions graphing sub-module 131, duplication analysis sub-module 133, and the data stored in user data database 114, which includes user credential data 116, and user account and transaction data 118.

In one embodiment, data acquisition sub-module 122 obtains user credential data 116, for one or more user account providers associated with one or more users of an account aggregation data management system. In various embodiments, user credential data 116 includes, but is not limited to, the name of an account provider, a user name and/or user email address, a password, passcode, or passphrase associated with the user and user account provider, and/or any user credential data as discussed herein, known in the art at the time of filing, or as developed after the time of filing.

In one embodiment, data acquisition sub-module 122 obtains the user credential data 116 by requesting the user credential data 116 from a user through a user interface of the account aggregation data management system. In other embodiments, the user credential data 116 is retrieved from user data database 114 of the account aggregation data management system.

In one embodiment, once user credential data 116 is obtained by data acquisition sub-module 122, the user credential data 116 is used by data acquisition sub-module 122 to obtain user account and transaction data 118 from the one or more user account providers associated with one or more users of the account aggregation data management system.

In various embodiments, the user credential data 116 is used by data acquisition sub-module 122 to access user account and transaction data 118 in a variety of ways, including but not limited to, logging in to a web interface of an account provider. In one embodiment, the user account and transaction data 118 is obtained through a mechanism such as, but not limited to, data scraping, downloading user account files, through an API provided by the user account provider, and/or by any other mechanism for obtaining user account and transaction data as discussed herein, known in the art at the time of filing, or as developed after the time of filing.

In various embodiments, the user account and transaction data 118 includes, but is not limited to, an account name and/or number, an account balance, user profile data such as name, location and billing data, the amounts and dates of individual user transactions, as well as the names and locations of payees named on individual transactions. In one embodiment, a user account name and/or number is given an identification label, which is herein referred to as a "user account ID."

In one embodiment, once user account and transaction data 118 is obtained by data acquisition sub-module 122, user account and transaction data 118 is processed by transaction grouping sub-module 124, by grouping the transactions into one or more transactions entities according to one or more transaction grouping parameters, a process which is discussed in further detail below.

Once one or more transactions entities are defined by the transaction grouping sub-module 124, transaction data from the transactions entities is processed by projection sub-module 126, which generates projections for the transactions entities. In one embodiment, projection sub-module 126 generates the projections for the transactions entities by projecting each of the transactions entities into n-dimensional space based upon entity projection parameters chosen to represent each of the transactions entities. In one embodiment, generating projections for the transactions entities includes processing the data from the individual transactions within the transactions entities, such as the amount of a particular transaction, in accordance with the entity projection parameters. For example, a projection may be generated by calculating the number of transactions in a given transactions entity, the mean of the transaction amounts in a given transactions entity, and the standard deviation of the transaction amounts in a given transactions entity.

In one embodiment, once the projections are generated for the transactions entities, projection sub-module 126 aggregates data from the transactions entities and the corresponding projections into a transactions entity projection table, which is described in further detail below. In one embodiment, once the transactions entity projection table is generated by projection sub-module 126, the data in the transactions entity projection table is processed by clustering sub-module 128.

In one embodiment, processing of the data in the transactions entity projection table by clustering sub-module 128 includes grouping the transactions entity projections by defined clustering parameters, a process which is discussed in further detail below. In one embodiment, once the data in the transactions entity projection table is processed by clustering sub-module 128, the data in the transactions entity projection table is analyzed by account matching sub-module 130 to identify user accounts with matching clustering parameter values.

In one embodiment, once user accounts with matching clustering parameter values are identified by account matching sub-module 130, the transactions entity projections for user accounts with matching clustering parameter values are aggregated into a matched accounts table by account matching sub-module 130. In one embodiment, matched accounts are defined as any two user accounts with matching values for their respective clustering parameters on at least one posted transaction date.

In one embodiment, once the matched accounts table is generated by account matching sub-module 130, the data in the matched accounts table is processed by transactions graphing sub-module 131 to generate a bi-directional transactions graph. In one embodiment, processing the data in the matched accounts table includes grouping, analyzing, and processing the data in the matched accounts table, resulting in a sum of the number of transactions across one or more posted transaction dates for each pair of matched accounts in the matched accounts table.

In one embodiment, the sum of the number of transactions across one or more posted transaction dates for each pair of matched accounts in the matched accounts table represents the total number of transactions in common between each pair of matched accounts, which is used by transactions graphing sub-module 131 in the generation of the bi-directional transactions graph, as discussed in further detail below.

In one embodiment, once the bi-directional transactions graph is generated by transactions graphing sub-module 131 the data from the bi-directional transactions graph is processed and analyzed by duplication analysis sub-module 133 to determine the likelihood of account duplication between any two user accounts.

In one embodiment, in duplication analysis sub-module 133, a threshold value is defined such that an edge weight between two nodes in the bi-directional transactions graph that is greater than or equal to the defined threshold value represents a high likelihood of account duplication between the two user accounts represented by the two nodes. In one embodiment, an edge weight between two nodes in the bi-directional transactions graph that is less than the defined threshold value represents a low likelihood of account duplication between the two user accounts represented by the two nodes.

Consequently, in one embodiment, data representing the edge weights, as calculated by transactions graphing sub-module 131, represents a reliable indication of the presence or absence of account duplication in a data management system, and thus duplication analysis sub-module 133 is able to provide a clear and reliable indication as to whether a problem exists within the data management system, within the user account provider system, and/or between individual user accounts.

Process

Figure 2:
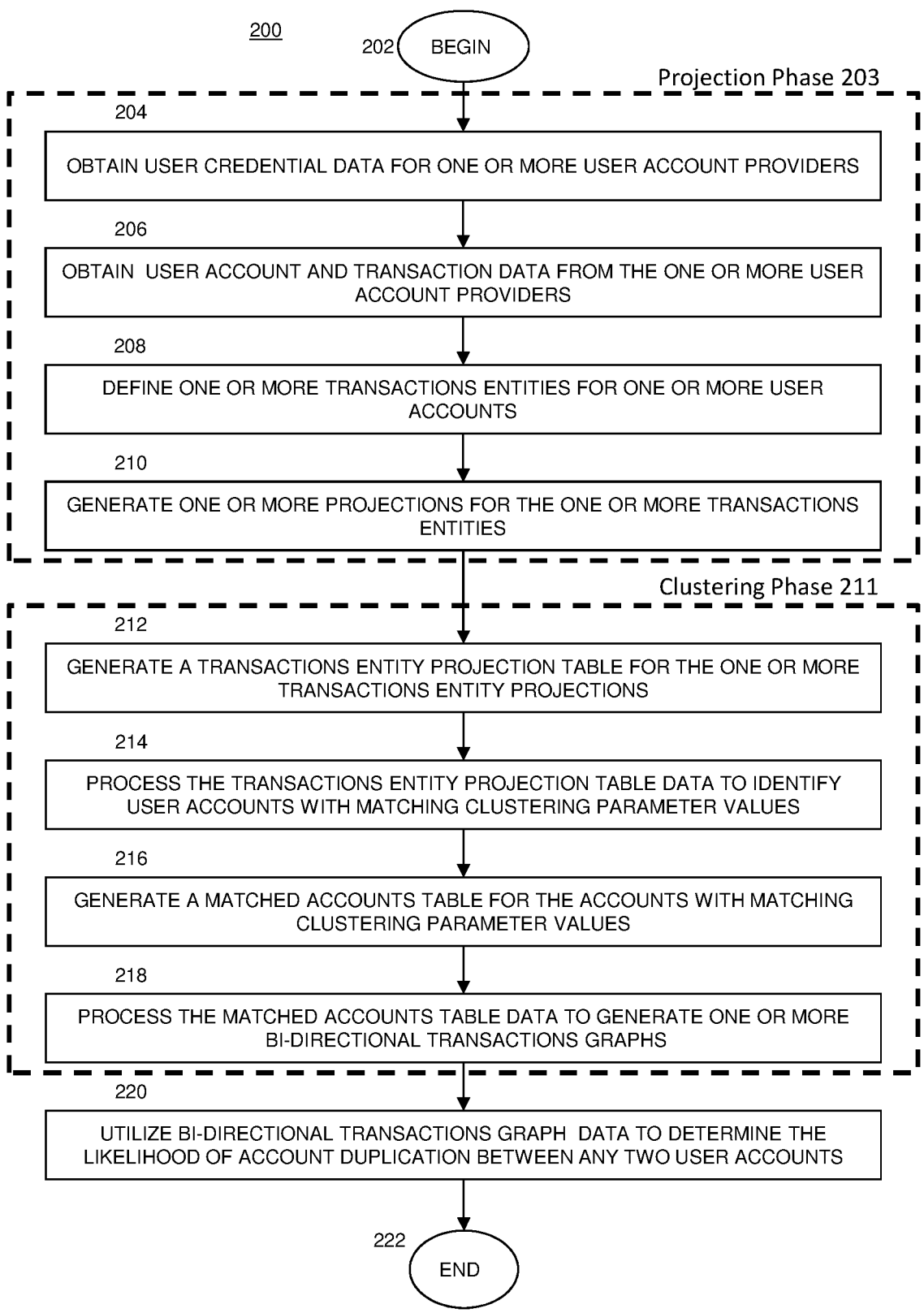
FIG. 2 is a flow diagram of a process for identifying account duplication in data management systems, in accordance with one embodiment.

FIG. 2 illustrates a flow diagram of a process 200 for identifying account duplication in data management systems, according to various embodiments.

In one embodiment, the first phase of process 200 is referred to as projection phase 203. In projection phase 203, user account and transaction data is obtained and the transaction data is grouped into transactions entities. The data from the transactions entities is then used to generate transactions entity projections.

In one embodiment, process 200 begins at BEGIN 202 and process flow proceeds into projection phase 203 and OBTAIN USER CREDENTIAL DATA FOR ONE OR MORE USER ACCOUNT PROVIDERS 204.

In one embodiment, at OBTAIN USER CREDENTIAL DATA FOR ONE OR MORE USER ACCOUNT PROVIDERS 204, user credential data for one or more user account providers is obtained by an account aggregation data management system.

In various embodiments, user credential data includes, but is not limited to, the name of a user account provider, a user name and/or user email address, a password, passcode, or passphrase, answers to security questions, identification numbers, birth dates, and/or any other user credential data as discussed herein, known in the art at the time of filing, or as developed after the time of filing.

In one embodiment, the user credential data is obtained by the account aggregation data management system by requesting the user credential data from a user through a user interface of the account aggregation data management system. In other embodiments, the user credential data is retrieved from a user database of the account aggregation data management system. In one embodiment, the set of credential data obtained for a given user is given an identification label, which is herein referred to as a "credential set ID."

In one embodiment, once user credential data is obtained by the account aggregation data management system at OBTAIN USER CREDENTIAL DATA FOR ONE OR MORE USER ACCOUNT PROVIDERS 204, projection phase 203 continues and the process flow proceeds to OBTAIN USER ACCOUNT AND TRANSACTION DATA FROM THE ONE OR MORE USER ACCOUNT PROVIDERS 206.

In one embodiment, at OBTAIN USER ACCOUNT AND TRANSACTION DATA FROM THE ONE OR MORE USER ACCOUNT PROVIDERS 206, the user credential data is used to obtain user account and transaction data from the one or more user account providers.

In various embodiments, the user credential data is used to access user account and transaction data in a variety of ways, including but not limited to, logging in to a web interface of an account provider. In one embodiment, the user account and transaction data is obtained through a mechanism such as, but not limited to, data scraping, downloading user account files, through an API provided by the user account provider, and/or any other mechanism for obtaining user account and transaction data as discussed herein, known in the art at the time of filing, or as developed after the time of filing.

In various embodiments, the user account and transaction data includes, but is not limited to, an account name and/or number, an account balance, user profile data such as name, location and billing data, the amounts and dates of individual transactions, as well as the names and locations of payees named on individual transactions. In one embodiment, a user account name and/or number is given an identification label, which is herein referred to as a "user account ID."

In one embodiment, once user account and transaction data is obtained at OBTAIN USER ACCOUNT AND TRANSACTION DATA FROM THE ONE OR MORE USER ACCOUNT PROVIDERS 206, projection phase 203 continues and process flow proceeds to DEFINE ONE OR MORE TRANSACTIONS ENTITIES FOR ONE OR MORE USER ACCOUNTS 208.

In one embodiment, at DEFINE ONE OR MORE TRANSACTIONS ENTITIES FOR ONE OR MORE USER ACCOUNTS 208, the user account and transaction data is processed and the transactions are grouped into one or more transactions entities according to one or more transaction grouping parameters.

In one embodiment, the one or more transaction grouping parameters are selected from a group of parameters that define the user account and transaction data, such as, but not limited to, a user credential set ID, a user account name, account number, or account ID, and a posted transaction date. The one or more transaction grouping parameters are then used to define the one or more transactions entities. For instance, in one embodiment, the transaction grouping parameters selected include a user credential set ID, a user account ID, and a posted transaction date. Consequently, in this exemplary embodiment, a transactions entity is defined as the collection of all account and transactional data found in a single posted transaction date for a user account of a particular user.

Figure 3:
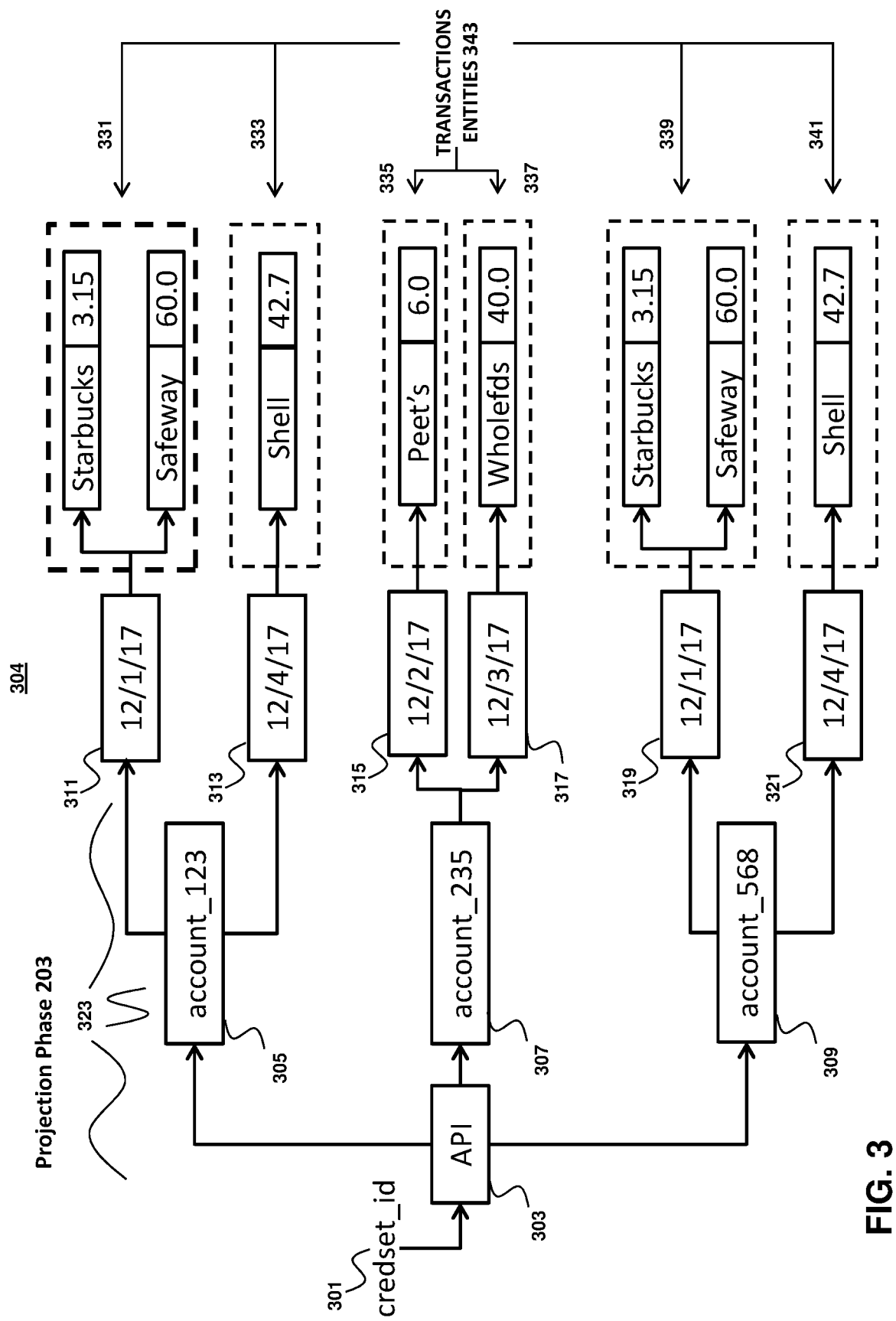
FIG. 3 is an illustrative diagram showing exemplary transactions obtained and grouped by the process for identifying account duplication in data management systems, in accordance with one embodiment.

FIG. 3 is an illustrative example of the process described above at OBTAIN USER ACCOUNT AND TRANSACTION DATA FROM THE ONE OR MORE USER ACCOUNT PROVIDERS 206 and DEFINE ONE OR MORE TRANSACTIONS ENTITIES FOR ONE OR MORE USER ACCOUNTS 208. As shown in FIG. 3, in one embodiment, user credential set ID 301 is provided to API 303, which interfaces with a user account provider to obtain user account and transaction data 304. In one embodiment, the user account and transaction data 304 comprises account data from user accounts 305, 307, and 309, as well as transaction data from transactions with posted transaction dates 311, 313, 315, 317, 319, and 321.

The user account and transaction data 304 is then grouped according to transaction grouping parameters 323, which in one embodiment include a user credential set ID, such as user credential set ID 301, a user account name, account number, or account ID, such as user accounts 305, 307, and 309, and a posted transaction date, such as posted transaction dates 311, 313, 315, 317, 319, and 321. Transactions entities 331, 333, 335, 337, 339, and 341 are thereby defined, in one embodiment, as the collection of all user account and transaction data found for a given user account in a single posted transaction date. The transactions entities defined at DEFINE ONE OR MORE TRANSACTIONS ENTITIES FOR ONE OR MORE USER ACCOUNTS 208 (FIG. 2) are hereafter referred to collectively as transactions entities 343 (FIG. 3).

Returning to FIG. 2, in one embodiment, once one or more transactions entities are defined at DEFINE ONE OR MORE TRANSACTIONS ENTITIES FOR ONE OR MORE USER ACCOUNTS 208, projection phase 203 continues and process flow proceeds to GENERATE ONE OR MORE PROJECTIONS FOR THE ONE OR MORE TRANSACTIONS ENTITIES 210.

In one embodiment, at GENERATE ONE OR MORE PROJECTIONS FOR THE ONE OR MORE TRANSACTIONS ENTITIES 210, the transaction data from the transactions entities is processed and used to generate projections for the transactions entities.

In one embodiment, the projections for the transactions entities are generated by projecting each of the transactions entities into n-dimensional space based upon entity projection parameters selected to represent each of the transactions entities. In one embodiment, the entity projection parameters selected to represent each of the transactions entities include, but are not limited to, the number of transactions in a transactions entity, the mean of the transaction amounts in a transactions entity, and the standard deviation of the transaction amounts in a transactions entity. In various other embodiments, different entity projection parameters may be chosen to represent each of the transactions entities.

FIG. 4 is an illustrative example of projections generated for one or more transactions entities in accordance with one embodiment, at GENERATE ONE OR MORE PROJECTIONS FOR THE ONE OR MORE TRANSACTIONS ENTITIES 210. Referring to FIG. 3 and FIG. 4 together, in one embodiment, the transaction data, such as the amount of a particular transaction, from transactions entities 331, 333, 335, 337, 339, and 341, is used to generate projections 431, 433, 435, 437, 439, and 441, which are collectively referred to in FIG. 4 as projections 401. In the embodiment illustrated by FIG. 4, entity projection parameters 403 are selected to represent each of the transactions entities 343 and include, but are not limited to, the number of transactions in each transactions entity ("num_transactions"), the mean of the transaction amounts in each transactions entity ("abs_mean"), and the standard deviation of the transaction amounts in each transactions entity ("abs_stdv").

The projections 401 are generated by processing the data from individual transactions in transactions entities 343, such as the amount of a particular transaction, in accordance with the entity projection parameters 403. For example, projection 431 is generated by calculating the number of transactions in transactions entity 331, which in the example illustrated is 2, the mean of the transaction amounts in transactions entity 331, which in the example illustrated is 31.57, and the standard deviation of the transaction amounts in transactions entity 331, which in the example illustrated is 28.425.

The projection phase 203 described above has the effect of greatly simplifying the process of identifying account duplication in account aggregation data management systems, by eliminating the need for an account aggregation data management system to analyze and process every individual piece of transaction data, such as but not limited to, the name of the payee and the exact amount of each of the user transactions. The Inventors have empirically determined that the selection of specific transaction grouping parameters 323, and entity projection parameters 403 in projection phase 203 contributes directly to the reliability of the account duplication indicator generated by the method and system for identifying account duplication in account aggregation data management systems.

Returning to FIG. 2, in one embodiment, once the projections are generated for the transactions entities in projection phase 203 at GENERATE ONE OR MORE PROJECTIONS FOR THE ONE OR MORE TRANSACTIONS ENTITIES 210, process flow proceeds into clustering phase 211 and GENERATE A TRANSACTIONS ENTITY PROJECTION TABLE FOR THE ONE OR MORE TRANSACTIONS ENTITY PROJECTIONS 212.

In one embodiment, the second phase of the method and system for identifying account duplication in account aggregation data management systems is referred to as clustering phase 211. In clustering phase 211, data from the transactions entities and the corresponding projections are aggregated into a transactions entity projection table, which is then further grouped according to specified clustering parameters to identify matching accounts. Once matching accounts are identified, transactions graph data is generated. In one embodiment, the transactions graph data then provides an account duplication indicator, which reliably and efficiently indicates the likelihood of account duplication in an account aggregation data management system.

In one embodiment, at GENERATE A TRANSACTIONS ENTITY PROJECTION TABLE FOR THE ONE OR MORE TRANSACTIONS ENTITY PROJECTIONS 212, data from the transactions entities and the corresponding projections are aggregated into a transactions entity projection table.

FIG. 5 is an illustrative example of a transactions entity projection table 501, as generated in accordance with one embodiment, at GENERATE A TRANSACTIONS ENTITY PROJECTION TABLE FOR THE ONE OR MORE TRANSACTIONS ENTITY PROJECTIONS 212.

Referring to FIG. 4 and FIG. 5 together, in one embodiment, clustering phase 211 begins by aggregating data from the individual transactions entities 331, 333, 335, 337, 339, and 341, and corresponding projections 431, 433, 435, 437, 439, and 441, to form transactions entity projections 503. In one embodiment, the data from transactions entity projections 503 is then used to generate transactions entity projection table 501, as shown in FIG. 5.

As further shown in FIG. 5, transactions entity projection table 501, as generated according to one embodiment, includes one row for each of the transactions entity projections 503, which include transactions entity projections 531, 533, 535, 537, 539, and 541. The transactions entity projection table 501 further includes one column for each of the transaction grouping parameters 323, which in one embodiment include the user credential set ID ("credset_id 505") associated with a transactions entity, the user account ID ("account_id 507") associated with a transactions entity, and the posted date ("posted_date 509") associated with a transactions entity, and one column for each of the entity projection parameters 403, which in one embodiment include the number of transactions in a transactions entity ("num_transactions 511"), the mean of the transaction amounts in a transactions entity ("abs_mean 513"), and the standard deviation of the transaction amounts in a transactions entity ("abs_stdv 515").

In various other embodiments, the transactions entity projection table 501 may contain more columns, fewer columns, and/or columns that are different than the columns listed above. For example, the transactions entity projection table 501 generated at GENERATE A TRANSACTIONS ENTITY PROJECTION TABLE FOR THE ONE OR MORE TRANSACTIONS ENTITY PROJECTIONS 212

(FIG. 2) may contain columns that correspond to a different selected set of transaction grouping parameters 323 and/or a different selected set of entity projection parameters 403 (FIG. 5).

Returning to FIG. 2, in one embodiment, once the transactions entity projection table is generated at GENERATE A TRANSACTIONS ENTITY PROJECTION TABLE FOR THE ONE OR MORE TRANSACTIONS ENTITY PROJECTIONS 212, clustering phase 211 continues and process flow proceeds to PROCESS THE TRANSACTIONS ENTITY PROJECTION TABLE DATA TO IDENTIFY USER ACCOUNTS WITH MATCHING CLUSTERING PARAMETER VALUES 214.

In one embodiment, at PROCESS THE TRANSACTIONS ENTITY PROJECTION TABLE DATA TO IDENTIFY USER ACCOUNTS WITH MATCHING CLUSTERING PARAMETER VALUES 214, the data in the transactions entity projection table is processed to identify user accounts with matching clustering parameter values.

In one embodiment, processing of the data in the transactions entity projection table includes grouping the transactions entity projections by selected clustering parameters. In one embodiment, the clustering parameters are selected from a group of parameters that define the data in the transactions entity table, such as, but not limited to, one or more of the transaction grouping parameters, and one or more of the entity projection parameters.

In one embodiment, the selected clustering parameters include the user credential set ID ("credset_id"), the posted date ("posted_date") associated with a transactions entity, the number of transactions in a transactions entity ("num_transactions"), the mean of the transaction amounts in a transactions entity ("abs_mean"), and the standard deviation of the transaction amounts in a transactions entity ("abs_stdv").

In various other embodiments, the clustering parameters may be selected to include elements other than those listed above. For example, if a set of transaction grouping parameters different than those listed above were selected in projection phase 203 at DEFINE ONE OR MORE TRANSACTIONS ENTITIES FOR ONE OR MORE USER ACCOUNTS 208 and/or a set of entity projection parameters different than those listed above were selected in projection phase 203 at GENERATE ONE OR MORE PROJECTIONS FOR THE ONE OR MORE TRANSACTIONS ENTITIES 210, then the clustering parameters used in clustering phase 211 may include any combination of the transaction grouping parameters and entity projection parameters that were previously selected.

In one embodiment, the values of the clustering parameters for each of the transactions entity projections in the transactions entity projection table are processed and analyzed to identify individual transactions entity projections that have matching clustering parameter values. In one embodiment, transactions entity projections are considered to have matching clustering parameter values when the value of each of the clustering parameters for one transactions entity projection is equal to the value of each of the corresponding clustering parameters for another of the transactions entity projections.

In various other embodiments, transactions entity projections are considered to have matching clustering parameter values when the value of each of the clustering parameters for one transactions entity projection is similar to the value of each of the corresponding clustering parameters for another of the transactions entity projections, where, in one embodiment, similarity of corresponding values is determined by defining a threshold maximum distance between each of the corresponding values. In one embodiment, when the distance between each of the corresponding values is below the defined threshold maximum, the transactions entity projections are considered to have matching clustering parameter values.

FIG. 6 is an illustrative example of a transactions entity projection table 601 as grouped in clustering phase 211 according to clustering parameters 603, as defined in one embodiment. Referring now to FIGS. 3, 4, 5, and 6 together, in the specific illustrative embodiment depicted in FIG. 6, the clustering parameters 603 are defined to include a subset of the previously selected transaction grouping parameters 323, namely, in this specific illustrative example, the user credential set ID ("credset_id 505"), and the posted date of the transactions entity ("posted_date 509"), as well as the previously selected entity projection parameters 403, which in the illustrative embodiment depicted in FIG. 6 include the number of transactions in each transactions entity ("num_transactions 511"), the mean of the transaction amounts in each transactions entity ("abs_mean 513"), and the standard deviation of the transaction amounts in each transactions entity ("abs_stdv 515").

As shown in FIG. 6, in one embodiment, transactions entity projections 531 and 539 are grouped together as matching transactions entity projections 605, due to the fact that the values of clustering parameters 603 for transactions entity projection 531 match the values of clustering parameters 603 for transactions entity projection 539. Similarly, transactions entity projections 533 and 541 are grouped together as matching transactions entity projections 607, due to the fact that the values of clustering parameters 603 for transactions entity projection 533 match the values of clustering parameters 603 for transactions entity projection 541.

Consequently, as is shown in the illustrative embodiment of FIG. 6, in the user account ID column ("account_id 507"), the user account "account 123" and the user account "account 568" are identified as user accounts with matching values for their respective clustering parameters 603 on two separate posted transaction dates, Dec. 1, 2017, and Dec. 4, 2017.

Returning to FIG. 2, in one embodiment, once user accounts with matching clustering parameter values are identified at PROCESS THE TRANSACTIONS ENTITY PROJECTION TABLE DATA TO IDENTIFY USER ACCOUNTS WITH MATCHING CLUSTERING PARAMETER VALUES 214, clustering phase 211 continues and process flow proceeds to GENERATE A MATCHED ACCOUNTS TABLE FOR THE ACCOUNTS WITH MATCHING CLUSTERING PARAMETER VALUES 216.

In one embodiment, at GENERATE A MATCHED ACCOUNTS TABLE FOR THE ACCOUNTS WITH MATCHING CLUSTERING PARAMETER VALUES 216, the transactions entity projections for user accounts with matching clustering parameter values are aggregated into a matched accounts table.

FIG. 7 is an illustrative example of a matched accounts table 701, as generated in accordance with one embodiment, at GENERATE A MATCHED ACCOUNTS TABLE FOR THE ACCOUNTS WITH MATCHING CLUSTERING PARAMETER VALUES 216.

Referring to FIG. 6 and FIG. 7 together, in one embodiment, matched accounts are defined as any two user accounts with matching values for their respective clustering parameters 603 on at least one posted transaction date. In one embodiment, the matched accounts table 701 is comprised of one row for each pair of accounts that were matched for a single posted transaction date. In FIG. 7, these are shown as matched account rows 705 and 707, and they correspond to matching transactions entity projections 605 and 607 from FIG. 6.

The matched accounts table 701 as shown in FIG. 7 further comprises one column for the account ID of a first matched account in the pair of matched accounts ("account_id_0 709"), and one column for the account ID of a second matched account in the pair of matched accounts ("account_id_1 711"). Additionally, as shown in the illustrative embodiment of FIG. 7, matched accounts table 701 also contains one column each for a subset of clustering parameters 603. In one embodiment, the subset of clustering parameters 603 includes, but is not limited to, the user credential set ID ("credset_id 505"), the posted date of the transactions entity ("posted_date 509"), and the number of transactions in each transactions entity ("num_transactions 511"). As discussed above, in various other embodiments the columns that make up matched accounts table 701 may be selected to include elements other than those listed in this specific illustrative embodiment.

In the simplified example illustrated in FIG. 7, the matched accounts table 701, at matched account row 705, shows that on Dec. 1, 2017, the first matched account in the pair of matched accounts, "account 123," and the second matched account in the pair of matched accounts, "account 568," had two transactions in common. These two transactions are defined as being transactions common to both "account 123" and "account 568," due to the matching analysis that occurred previously, at PROCESS THE TRANSACTIONS ENTITY PROJECTION TABLE DATA TO IDENTIFY USER ACCOUNTS WITH MATCHING CLUSTERING PARAMETER VALUES 214 (FIG. 2).

Similarly, as also illustrated in FIG. 7, the matched accounts table 701, at matched account row 707, shows that on Dec. 4, 2017, the first matched account in the pair of matched accounts, "account_123," and the second matched account in the pair of matched accounts, "account_568," had one transaction in common. This one transaction is defined as being a transaction common to both "account_123" and "account 568," due to the matching analysis that occurred previously, at PROCESS THE TRANSACTIONS ENTITY PROJECTION TABLE DATA TO IDENTIFY USER ACCOUNTS WITH MATCHING CLUSTERING PARAMETER VALUES 214 (FIG. 2).

Looking at FIG. 6 and FIG. 7 together, of further note, in one embodiment, is the fact that the data values for some of the clustering parameters 603, such as but not limited to, the mean of the transaction amounts in each transactions entity ("abs_mean 513"), and the standard deviation of the transaction amounts in each transactions entity ("abs_stdv 515") are no longer needed for further analysis, now that the account matching analysis has been completed.

Returning to FIG. 2, in one embodiment, once the matched accounts table is generated at GENERATE A MATCHED ACCOUNTS TABLE FOR THE ACCOUNTS WITH MATCHING CLUSTERING PARAMETER VALUES 216, clustering phase 211 continues and process flow proceeds to PROCESS THE MATCHED ACCOUNTS TABLE DATA TO GENERATE ONE OR MORE BI-DIRECTIONAL TRANSACTIONS GRAPHS 218.

In one embodiment, at PROCESS THE MATCHED ACCOUNTS TABLE DATA TO GENERATE ONE OR MORE BI-DIRECTIONAL TRANSACTIONS GRAPHS 218, the data in the matched accounts table is processed to generate one or more bi-directional transactions graph.

Referring back to FIG. 7, in one embodiment, processing the data in the matched accounts table includes grouping the data in the matched accounts table 701 by selected columns such as, but not limited to, user credential set ID ("credset_id" 505), the account ID of the first matched account in the pair of matched accounts ("account_id_0 709"), and the account ID of the second matched account in the pair of matched accounts ("account_id_1 711"). In one embodiment, once the data from matched accounts table 701 is grouped, the data in the matched accounts table 701 is further processed by summing the number of transactions across one or more posted transaction dates for each pair of matched accounts in the matched accounts table 701.

In one embodiment, the data in the matched accounts table 701 is processed by summing the number of transactions across the last two, three, or four posted transaction dates, since the Inventors have empirically determined that processing account and transaction data from the most current dates provides a more reliable identification of current account duplication issues. In other embodiments, the data in the matched accounts table 701 is processed by summing the number of transactions across five or more posted transaction dates, since the Inventors have also empirically determined that processing account and transaction data over a greater time period will potentially uncover a greater number of account duplication issues. Therefore, one of skill in the art will readily appreciate that the data in the matched accounts table 701 can be summed across any period of time.

In one embodiment, the summation of the number of transactions across one or more posted transaction dates for each pair of matched accounts in the matched accounts table 701 results in a total number of transactions in common between each pair of matched accounts, which is used in the generation of the bi-directional transactions graph at PROCESS THE MATCHED ACCOUNTS TABLE DATA TO GENERATE ONE OR MORE BI-DIRECTIONAL TRANSACTIONS GRAPHS 218 (FIG. 2).

Figures 8A, 8B:
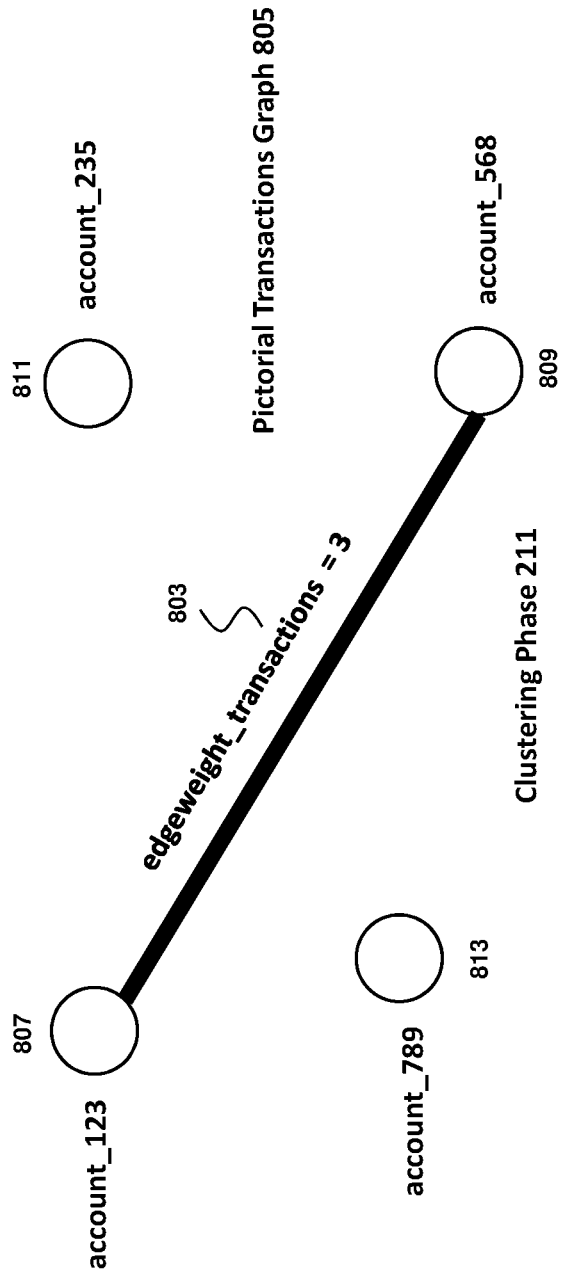
FIG. 8A is an illustrative example of a transactions graph in tabular form, in accordance with one embodiment.
FIG. 8B is an illustrative example of a transactions graph in pictorial form, in accordance with one embodiment.

FIG. 8A shows an exemplary tabular transactions graph 801, as generated in accordance with one illustrative embodiment. While, in one embodiment, the tabular form of the bi-directional transactions graph is the direct result of the method and system discussed herein, the data that is contained in the tabular form of the bi-directional transactions graph is often presented in graphical, or pictorial form as well, to provide a clear and accessible visualization of what the data in the bi-directional transactions graph represents. FIG. 8B shows pictorial transactions graph 805, which is simply a different representation of the data in tabular transactions graph 801, as generated in accordance with one illustrative embodiment.

The pictorial transactions graph 805 shown in FIG. 8B is generated by defining each node in pictorial transactions graph 805, nodes 807, 809, 811, and 813 as a user account, while each edge between nodes 807, 809, 811, and 813 in pictorial transactions graph 805 represents a bi-directional matching between two user accounts matched by the process described above at PROCESS THE TRANSACTIONS ENTITY PROJECTION TABLE DATA TO IDENTIFY USER ACCOUNTS WITH MATCHING CLUSTERING PARAMETER VALUES 214 (FIG. 2).

Returning to FIG. 8B, in one embodiment, the weight of the edge between any pair of matched accounts ("edge-weight_transactions 803") represents the total number of transactions in common between each pair of matched accounts, as described above. As shown in FIG. 8B, in one illustrative embodiment, node 807 represents "account_123," and node 809 represents "account_568." The total number of transactions in common between "account_123" and "account_568" was found to be 3 transactions. Thus, in this illustrative embodiment, "edgeweight_transactions 803" between "account_123" and "account_568" is equal to 3, while "account_235," represented by node 811, and "account 789," represented by node 813, did not have any transactions in common, and so an edge does not exist between those two accounts.

Returning to FIG. 2, in one embodiment, once the bi-directional transactions graph is generated at PROCESS THE MATCHED ACCOUNTS TABLE DATA TO GENERATE ONE OR MORE BI-DIRECTIONAL TRANSACTIONS GRAPHS 218, clustering phase 211 ends, and process flow proceeds to UTILIZE BI-DIRECTIONAL TRANSACTIONS GRAPH DATA TO DETERMINE THE LIKELIHOOD OF ACCOUNT DUPLICATION BETWEEN ANY TWO USER ACCOUNTS 220.

In one embodiment, at UTILIZE BI-DIRECTIONAL TRANSACTIONS GRAPH DATA TO DETERMINE THE LIKELIHOOD OF ACCOUNT DUPLICATION BETWEEN ANY TWO USER ACCOUNTS 220, the data from the bi-directional transactions graph is processed and analyzed to determine the likelihood of account duplication between any two user accounts.

In one embodiment, a threshold value is defined such that an edge weight between two nodes in the bi-directional transactions graph that is greater than or equal to the defined threshold value represents a high likelihood of account duplication between the two user accounts represented by the two nodes. In one embodiment, an edge weight between two nodes in the bi-directional transactions graph that is less than the defined threshold value represents a low likelihood of account duplication between the two user accounts represented by the two nodes.

Consequently, in one embodiment, the edge weights, as calculated by the method and system for identifying account duplication in data management systems disclosed herein, represent an indication of the presence or absence of account duplication in the data management system. The Inventors have empirically determined that the account duplication indicators, i.e., the edge weights, generated by the method and system for identifying account duplication disclosed herein are reliable indicators of the presence or absence of account duplication in an account aggregation data management system.

Further, in addition to providing reliable account duplication indicators, the method and system for identifying account duplication as disclosed herein allows for duplicate accounts to be readily identified without the need for costly analysis and wasteful use of time and resources.

Referring again to FIG. 8A and FIG. 8B, although the edge weight, ("edgeweight_transactions 803") in this simple illustrative example is relatively low at 3, it should be apparent to one of skill in the art that if "account_123" and "account_568" are in fact duplicate accounts, in one embodiment, the value of the account duplication indicator, as generated by the method and system for identifying account duplication disclosed herein, will rise steadily over time, thus providing a clear indication to those parties in possession of the data provided by the bi-directional transactions graph that a problem exists between those two accounts and/or in the data management system and/or in the user account provider system on a system-wide level.

Returning to FIG. 2, in one embodiment, once the bi-directional transactions graph is utilized at UTILIZE BI-DIRECTIONAL TRANSACTIONS GRAPH DATA TO DETERMINE THE LIKELIHOOD OF ACCOUNT DUPLICATION BETWEEN ANY TWO USER ACCOUNTS 220, process flow proceeds to END 222. In one embodiment, at END 222 the process for identifying account duplication in data management systems is exited to await new data and/or instructions.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining," "training," "extracting," "executing," "mapping," "analyzing," "providing," "enforcing," "monitoring," "generating," "defining," "determining," "calculating," "transforming," "correlating," "normalizing," "accessing," "analyzing," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resistors, caches or other information storage, transmission or display devices.

Certain aspects of the present invention include process steps or operations and instructions described herein in algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for identifying account duplication, the method performed by one or more processors of a computer-implemented system and comprising:

obtaining, from one or more users, user credential data associated with one or more user account providers;

obtaining, from the one or more user account providers, using the user credential data, user account and transaction data associated with one or more user accounts;

selecting, from a group of parameters that define the user account and transaction data, one or more transaction grouping parameters;

defining, using the selected transaction grouping parameters, one or more transactions entities for the one or more user accounts;

selecting one or more entity projection parameters to represent the one or more transactions entities;

generating, using the user account and transaction data in the one or more transactions entities, one or more projections for the one or more transactions entities, based on the selected entity projection parameters;

generating, using the user account and transaction data in the one or more transactions entities and projection data in the one or more projections, a transactions entity projection table for one or more transactions entity projections;

selecting, from a group of parameters that define the data in the transactions entity projection table, one or more clustering parameters;

processing the data in the transactions entity projection table to identify user accounts with matching clustering parameter values;

generating a matched accounts table for the user accounts with matching clustering parameter values;

processing data from the matched accounts table to generate data representing one or more bi-directional transactions graphs; and utilizing data representing at least part of the one or more bi-directional transactions graphs to determine a likelihood of account duplication between any of the one or more user accounts.

2. The method of claim 1, wherein the group of parameters include one or more of:

a set of user credentials associated with a user and a user account provider;

a credential set ID associated with a set of user credentials;

an account name associated with a user account;

an account number associated with a user account;

an account ID associated with a user account;

an account balance associated with a user account;

a name of a user associated with a user account;

an address a user associated with a user account;

a billing data a user associated with a user account;

an amount of each transaction associated with a user account;

a posted transaction date of each transaction associated with a user account;

a name of the payee for each transaction associated with a user account; and an address of the payee for each transaction associated with a user account.

3. The method of claim 1, wherein the selected transaction grouping parameters include one or more of:

a credential set ID associated with a set of user credentials;

an account ID associated with a user account; and the posted transaction date of each transaction associated with a user account.

4. The method of claim 1, wherein defining one or more transactions entities for one or more user accounts includes:
- grouping the user account and transaction data into one or more groups according to the selected transaction grouping parameters; and
- defining the one or more transactions entities as a collection of all user account and transactional data found in each of the one or more groups, as grouped according to the selected transaction grouping parameters.

5. The method of claim 1, wherein the selected entity projection parameters include one or more of:
- a number of transactions in each of the transactions entities;
- a mean of the transaction amounts in each of the transactions entities; and
- a standard deviation of the transaction amounts in each of the transactions entities.

6. The method of claim 1, wherein generating the one or more projections for the one or more transactions entities includes:
- processing the user transaction data from individual transactions within each of the one or more transactions entities in accordance with selected entity projection parameters.

7. The method of claim 6, wherein processing the user transaction data in accordance with the selected entity projection parameters includes one or more of:
- calculating a number of transactions in a given transactions entity;
- calculating a mean of the transaction amounts in a given transactions entity; and
- calculating a standard deviation of the transaction amounts in a given transactions entity.

8. The method of claim 1, wherein generating a transactions entity projection table for the one or more transactions entity projections comprise includes:
- aggregating user account and transaction data from the one or more transactions entities and the projection data into a transactions entity projection table.

9. The method of claim 8, wherein the transactions entity projection table includes:
- one row for each of the transactions entity projections;
- one column for each of the selected transaction grouping parameters; and
- one column for each of the selected entity projection parameters.

10. The method of claim 9, wherein the selected transaction grouping parameters include one or more of:
- a credential set ID associated with a set of user credentials;
- an account ID associated with a user account; and
- the posted transaction date of each transaction associated with a user account.

11. The method of claim 9, wherein the selected entity projection parameters include one or more of:
- a number of transactions in each of the transactions entities;
- a mean of the transaction amounts in each of the transactions entities; and
- a standard deviation of the transaction amounts in each of the transactions entities.

12. The method of claim 1, wherein the one or more clustering parameters are selected from a group of parameters comprising including one or more of the selected transaction grouping parameters and one or more of the selected entity projection parameters.

13. The method of claim 12, wherein the selected clustering parameters include one or more of:
- a credential set ID associated with a set of user credentials;
- a posted transaction date of each transaction associated with a user account;
- a number of transactions in each of the transactions entities;
- a mean of the transaction amounts in each of the transactions entities; and
- a standard deviation of the transaction amounts in each of the transactions entities.

14. The method of claim 1, wherein processing data in the transactions entity projection table to identify user accounts with matching clustering parameter values includes one or more of:
- grouping the transactions entity projections in the transactions entity projection table by the selected clustering parameters; and
- analyzing the values of the selected clustering parameters for each of the transactions entity projections in the transactions entity projection table to identify transactions entity projections that have matching clustering parameter values.

15. The method of claim 14, wherein two transactions entity projections are considered to have matching clustering parameter values when the value of each of the clustering parameters for a first of the two transactions entity projections is equal to the value of each of the corresponding clustering parameters for a second of the two transactions entity projections.

16. The method of claim 1, wherein two transactions entity projections are considered to have matching clustering parameter values when the value of each of the clustering parameters for a first of the two transactions entity projections is within a defined threshold of the value of each of the corresponding clustering parameters for a second of the two transactions entity projections.

17. The method of claim 1, wherein generating a matched accounts table includes:
- aggregating the transactions entity projections with matching clustering parameter values into a matched accounts table.

18. The method of claim 17, wherein the matched accounts table includes:
- one or more rows for each pair of matched accounts having matching clustering parameter values on at least one posted transaction date;
- one column for an account ID of a first matched account in each pair of matched accounts;
- one column for an account ID of a second matched account in each pair of matched accounts; and
- one column each for one or more of the selected clustering parameters.

19. The method of claim 18, wherein the one or more of the selected clustering parameters includes:
- a credential set ID associated with a set of user credentials;
- a posted transaction date of each transaction associated with a user account; and
- a number of transactions in each of the transactions entities.

20. The method of claim 1, wherein processing data from the matched accounts table includes one or more of:
- grouping the data from the matched accounts table by selected columns of the matched accounts table;

summing a number of transactions across one or more posted transaction dates for each pair of matched accounts in the matched accounts table to obtain a total number of transactions in common between each pair of matched accounts for the one or more posted transaction dates; and generating one or more bi-directional transactions graphs using the data from the selected columns of the matched accounts table and the data representing the total number of transactions in common between each pair of matched accounts.

21. The method of claim 20, wherein the selected columns of the matched accounts table include one or more of:

a column for a credential set ID associated with a set of user credentials;

a column for an account ID of a first matched account in the pair of matched accounts; and a column for an account ID of a second matched account in the pair of matched accounts.

22. The method of claim 20, wherein generating one or more bi-directional transactions graphs includes one or more of:

generating a bi-directional transactions graph in tabular form; and generating a bi-directional transactions graph in pictorial form.

23. The method of claim 22, wherein generating a bi-directional transactions graph in tabular form includes:

aggregating the data from the selected columns of the matched accounts table and the data representing the total number of transactions in common between each pair of matched accounts into a transactions graph table.

24. The method of claim 23, wherein the transactions graph table includes one or more of:

one row for each pair of matched accounts;

one column for the account ID of a first matched account in each pair of matched accounts;

one column for the account ID of a second matched account in each pair of matched accounts; and one column for the total number of transactions in common between each pair of matched accounts.

25. The method of claim 22, wherein generating a bi-directional transactions graph in pictorial form includes one or more of:

defining each node in the bi-directional transactions graph as an individual user account;

defining an edge between two nodes in the bi-directional transactions graph as a representation of a bi-directional matching between a pair of matched accounts; and defining an edge weight of an edge in the bi-directional transactions graph as an integer representing the total number of transactions in common between each pair of matched accounts for the one or more posted transaction dates.

26. The method of claim 1, wherein utilizing data representing at least part of the one or more bi-directional transactions graphs includes:

defining a threshold value such that an edge weight between two nodes in the bi-directional transactions graph that is greater than or equal to the threshold value represents a high likelihood of account duplication between two user accounts represented by the two nodes in the bi-directional transactions graph, and an edge weight between two nodes in the bi-directional transactions graph that is less than the threshold value represents a low likelihood of account duplication between the two user accounts represented by the two nodes in the bi-directional transactions graph.

27. A method for identifying account duplication, the method performed by one or more processors of a computer-implemented system and comprising:

obtaining user account and transaction data from one or more user accounts associated with a user account provider;

analyzing the user account and transaction data to define one or more transactions entities;

projecting the one or more transactions entities into an n-dimensional space according to specified entity projection parameters to generate one or more transactions entity projections wherein n represents a number of dimensions;

clustering the transactions entity projections according to specified clustering parameters to generate data representing one or more bi-directional transactions graphs; and utilizing data representing at least part of the one or more bi-directional transactions graphs to determine a likelihood of account duplication between any of the one or more user accounts.

28. The method of claim 27, wherein analyzing the user account and transaction data to define one or more transactions entities further includes:

selecting, from a group of parameters that define the user account and transaction data, one or more transaction grouping parameters; and defining, using the selected transaction grouping parameters, one or more transactions entities for the one or more user accounts.

29. The method of claim 27, wherein projecting the one or more transactions entities into the n-dimensional space according to specified entity projection parameters includes:

selecting one or more entity projection parameters to represent the one or more transactions entities;

generating, using the user account and transaction data in the one or more transactions entities, one or more projections for the one or more transactions entities, based on the selected entity projection parameters;

generating, using the user account and transaction data in the one or more transactions entities and projection data in the one or more projections, a transactions entity projection table for one or more transactions entity projections.

30. The method of claim 27, wherein clustering the transactions entity projections according to specified clustering parameters includes:

selecting, from a group of parameters that define the data in a transactions entity projection table, one or more clustering parameters;

processing the data in the transactions entity projection table to identify user accounts with matching clustering parameter values;

generating a matched accounts table for the user accounts with matching clustering parameter values; and processing data from the matched accounts table to generate one or more bi-directional transactions graphs.

31. The method of claim 27, wherein utilizing data representing at least part of the one or more bi-directional transactions graphs includes:

defining a threshold value such that an edge weight between two nodes in the bi-directional transactions graph that is greater than or equal to the threshold value represents a high likelihood of account duplication between two user accounts represented by the two nodes in the bi-directional transactions graph, and an edge weight between two nodes in the bi-directional transactions graph that is less than the threshold value represents a low likelihood of account duplication between the two user accounts represented by the two nodes in the bi-directional transactions graph.

32. A system for identifying account duplication comprising:
one or more processors;
at least one memory coupled to the one or more processors and storing instructions that, when executed by the one or more processors, cause the system to perform operations including:
obtaining user account and transaction data from one or more user accounts associated with a user account provider;
analyzing the user account and transaction data to define one or more transactions entities;
projecting the one or more transactions entities into an n-dimensional space according to specified entity projection parameters to generate one or more transactions entity projections, wherein n represents a number of dimensions;
clustering the transactions entity projections according to specified clustering parameters to generate data representing one or more bi-directional transactions graphs; and
utilizing data representing at least part of the one or more bi-directional transactions graphs to determine a likelihood of account duplication between any of the one or more user accounts.

33. The system of claim 32, wherein analyzing the user account and transaction data includes:
selecting, from a group of parameters that define the user account and transaction data, one or more transaction grouping parameters; and
defining, using the selected transaction grouping parameters, one or more transactions entities for the one or more user accounts.

34. The system of claim 32, wherein projecting the one or more transactions entities into the n-dimensional space includes:
selecting one or more entity projection parameters to represent the one or more transactions entities;
generating, using the user account and transaction data in the one or more transactions entities, one or more projections for the one or more transactions entities, based on the selected entity projection parameters; and
generating, using the user account and transaction data in the one or more transactions entities and projection data in the one or more projections, a transactions entity projection table for one or more transactions entity projections.

35. The system of claim 32, wherein clustering the transactions entity projections includes:
selecting, from a group of parameters that define the data in a transactions entity projection table, one or more clustering parameters;
processing the data in the transactions entity projection table to identify user accounts with matching clustering parameter values;
generating a matched accounts table for the user accounts with matching clustering parameter values; and
processing data from the matched accounts table to generate one or more bi-directional transactions graphs.

36. The system of claim 32, wherein utilizing data representing at least part of the one or more bi-directional transactions graphs includes:
defining a threshold value such that an edge weight between two nodes in the bi-directional transactions graph that is greater than or equal to the threshold value represents a high likelihood of account duplication between two user accounts represented by the two nodes in the bi-directional transactions graph, and an edge weight between two nodes in the bi-directional transactions graph that is less than the threshold value represents a low likelihood of account duplication between the two user accounts represented by the two nodes in the bi-directional transactions graph.

* * * * *